US012332681B1

(12) United States Patent
Emery et al.

(10) Patent No.: US 12,332,681 B1
(45) Date of Patent: Jun. 17, 2025

(54) CLOCK SELECTION IN A CLOCK DISTRIBUTION NETWORK

(71) Applicant: Amazon Technologies, Inc., Seattle, WA (US)

(72) Inventors: Scott Andrew Emery, Saratoga, CA (US); James Paul Rivers, Capitola, CA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 17/839,309

(22) Filed: Jun. 13, 2022

(51) Int. Cl.
*G06F 1/10* (2006.01)
*G06F 1/06* (2006.01)
*G06F 1/08* (2006.01)

(52) U.S. Cl.
CPC .................. *G06F 1/10* (2013.01); *G06F 1/06* (2013.01); *G06F 1/08* (2013.01)

(58) Field of Classification Search
CPC ..... G06F 1/06; G06F 1/08; G06F 1/10; G06F 1/12; G06F 1/14; G06F 1/3237; G06F 1/324; G06F 11/1604
See application file for complete search history.

(56) References Cited

U.S. PATENT DOCUMENTS

| | | | | |
|---|---|---|---|---|
| 4,398,155 A * | 8/1983 | Atwell, Jr. | ........... | H03K 17/693 327/279 |
| 5,361,277 A | 11/1994 | Grover et al. | | |
| 5,564,042 A * | 10/1996 | Ventrone | .................. | G06F 1/08 710/61 |
| 5,790,609 A * | 8/1998 | Swoboda | .................. | G06F 1/08 375/357 |
| 6,055,021 A * | 4/2000 | Twitchell | ........... | H04N 21/4314 348/E7.039 |
| 6,121,816 A * | 9/2000 | Tonks | ....................... | G06F 1/10 327/12 |
| 6,226,699 B1 * | 5/2001 | Humpherys | ........ | G06F 13/4068 710/100 |
| 6,754,171 B1 * | 6/2004 | Bernier | ................. | H04J 3/0688 370/216 |

(Continued)

OTHER PUBLICATIONS

How, Denis. "The Free On-Line Dictionary of Computing". Entry 'Integrated Circuit'. Online Jul. 3, 1997. Retrieved from Internet Feb. 27, 2024. <https://foldoc.org/integrated+circuit>. (Year: 1997).*

*Primary Examiner* — Thomas J. Cleary
(74) *Attorney, Agent, or Firm* — Klarquist Sparkman, LLP (57) ABSTRACT

A clock selection circuit allows seamless switching between different clock signals in a clock distribution network. The clock selection circuit can be an Integrated Circuit (IC). The clock signals can be analyzed by a processor in communication with the IC to ensure the clock signals are validated. Analysis can include comparing time stamps between received pulses of the clock signals to determine if the clock signals are occurring at regular intervals. The processor can then assign a priority order to the clock signals and select one of the clock signals to use. An identifier associated with the selected clock signal can be programmed into the IC. The IC can then redistribute the selected clock signal to multiple other ICs in a hierarchical clock distribution network. Ultimately, the distributed clock signal can be received by server computers to ensure instances being executed have accurate and synchronized timing.

15 Claims, 8 Drawing Sheets

(56) References Cited

U.S. PATENT DOCUMENTS

| | | | | |
|---|---|---|---|---|
| 6,963,990 B2* | 11/2005 | Allen | | G06F 13/4027 713/600 |
| 7,154,298 B1* | 12/2006 | Agrawal | | H03K 19/17744 326/39 |
| 7,562,247 B2* | 7/2009 | Baker | | G06F 11/1604 714/2 |
| 7,629,828 B1* | 12/2009 | Nekl | | G06F 1/08 327/407 |
| 7,649,910 B1* | 1/2010 | Wechsler | | H04L 12/422 370/518 |
| 7,911,239 B2* | 3/2011 | Saint-Laurent | | H04L 7/0083 327/99 |
| 8,204,166 B2* | 6/2012 | Bommareddy | | G06F 1/04 327/147 |
| 8,975,921 B1* | 3/2015 | Sangolli | | H03K 19/08 326/46 |
| 10,084,559 B1 | 9/2018 | Devineni | | |
| 11,212,068 B1 | 12/2021 | Liu et al. | | |
| 11,263,377 B1* | 3/2022 | Majumdar | | G06F 11/27 |
| 11,509,410 B2 | 11/2022 | Furtner | | |
| 11,606,156 B1 | 3/2023 | Duda et al. | | |
| 11,757,610 B1 | 9/2023 | Kessel et al. | | |
| 2003/0184347 A1* | 10/2003 | Haroun | | G06F 1/08 327/99 |
| 2005/0259505 A1* | 11/2005 | Grand | | G01R 31/31727 365/210.1 |
| 2008/0046774 A1* | 2/2008 | Hirai | | G06F 1/10 713/500 |
| 2008/0094108 A1* | 4/2008 | Leon | | G01R 31/31721 327/99 |
| 2009/0092210 A1 | 4/2009 | Green et al. | | |
| 2013/0301635 A1* | 11/2013 | Hollabaugh | | H04W 56/0035 370/350 |
| 2017/0104727 A1 | 4/2017 | Jerkeby et al. | | |
| 2019/0356313 A1* | 11/2019 | Venugopal | | H03K 3/0375 |
| 2019/0379599 A1 | 12/2019 | Siracusano et al. | | |
| 2021/0337498 A1 | 10/2021 | Lee et al. | | |
| 2021/0382519 A1* | 12/2021 | Chang | | G06F 1/12 |
| 2022/0069970 A1 | 3/2022 | Snowden et al. | | |
| 2022/0286267 A1 | 9/2022 | Niimi et al. | | |
| 2023/0060679 A1 | 3/2023 | Pustylnik et al. | | |
| 2023/0079341 A1 | 3/2023 | Afshari | | |
| 2023/0134197 A1 | 5/2023 | Heinrich et al. | | |
| 2023/0185757 A1* | 6/2023 | Takefman | | H04B 1/0483 710/110 |
| 2024/0097783 A1 | 3/2024 | Rolston et al. | | |
| 2024/0361981 A1 | 10/2024 | R | | |

* cited by examiner

CLOCK SELECTION IN A CLOCK DISTRIBUTION NETWORK

BACKGROUND

Computing devices can utilize communication networks to exchange data. Companies and organizations operate computer networks that interconnect computing devices to support operations or to provide services to third parties. The computing systems can be located in a single geographic location or located in multiple, distinct geographic locations. Data centers or data processing centers, herein generally referred to as a "data center," may include a number of interconnected computing systems to provide computing resources to users of the data center.

To facilitate increased utilization of data center resources, virtualization technologies allow a single physical computing device to host one or more instances of virtual machines that operate as independent computing devices to users of the data center. With virtualization, the single physical computing device can create, maintain, delete, and manage virtual machines in a dynamic manner. In turn, users can request computer resources from the data center and be provided with virtual machine resources. These virtual machines carry out a wide variety of functionalities, such as invoking network-accessible services, conducting data processing, etc.

In some cases, multiple computing devices may be interconnected to provide desired functionality. Such devices may be referred to as "distributed," such as by implementing a distributed service or a distributed computing environment. One challenge that often occurs in distributed computing is the difficulty of creating a shared notion of time. It may be desirable to use time information to implement various policies in a computing service, such as to resolve priority of conflicting requests. However, in the distributed context, each device may have an independent notion of time, and, as such, it may be difficult to determine which conflicting requests occurred first. A variety of techniques exist to attempt to synchronize time between networked computers. For example, the Network Time Protocol (NTP) enables computing devices to communicate with a reference timekeeper over a network and receive a current time. NTP can be used to synchronize a plurality of computers in a network to a universal time clock. However, such techniques are typically not sufficiently accurate or are too complex to implement in wide-scale distributed computing platforms. Moreover, any failover mechanism requires a time-consuming re-synchronization of a backup system clock.

DETAILED DESCRIPTION

A clock selection circuit allows seamless switching between different clock signals in a clock distribution network. The clock selection circuit can be an Integrated Circuit (IC) and can be programmable, such as a Field Programmable Gate Array (FPGA). The clock signals can be analyzed by a processor in communication with the IC to ensure the clock signals are validated. Analysis can include comparing time stamps between received pulses of the clock signals to determine if the clock signals are occurring at regular intervals. The processor can then assign a priority order to the clock signals and select one of the clock signals to use. An identifier associated with the selected clock signal can be programmed into the IC. The IC can then redistribute the selected clock signal to multiple other ICs in a hierarchical clock distribution network. Ultimately, the distributed clock signal can be received by server computers to ensure instances being executed have accurate and synchronized timing. In case of failover, switching to one of the alternative clock signals can occur quickly and seamlessly by switching the identifier.

Figure 1:
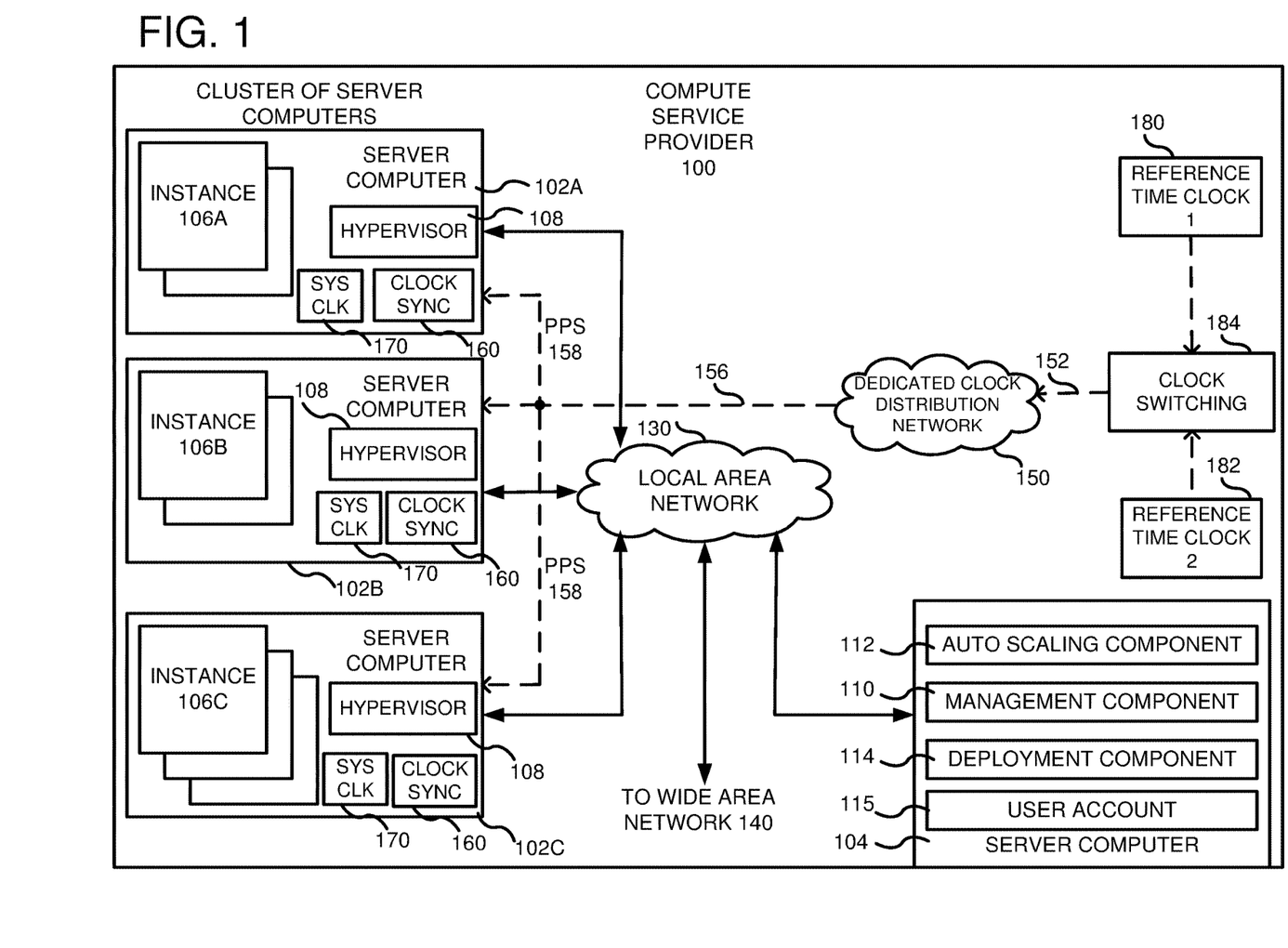
FIG. 1 is an example system diagram showing a plurality of virtual machine instances running in a multi-tenant environment with separate networks for communication and clock distribution, with clock switching hardware selecting between multiple clock sources.

FIG. 1 is a computing system diagram of a network-based compute service provider 100 that illustrates one environment in which embodiments described herein can be used. By way of background, the compute service provider 100 (e.g., the cloud provider) is capable of delivery of computing and storage capacity as a service to a community of end recipients. In an example embodiment, the compute service provider can be established for an organization by or on behalf of the organization. That is, the compute service provider 100 may offer a "private cloud environment." In another embodiment, the compute service provider 100 supports a multi-tenant environment, wherein a plurality of users operate independently (e.g., a public cloud environment). Generally speaking, the compute service provider 100 can provide the following models: Infrastructure as a Service ("IaaS"), Platform as a Service ("PaaS"), and/or Software as a Service ("SaaS"). Other models can be provided. For the IaaS model, the compute service provider 100 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 100 using networked client devices, such as desktop computers, laptops, tablets, smartphones, etc. running web browsers or other lightweight client applications. Those skilled in the art will recognize that the compute service provider 100 can be described as a "cloud" environment.

In some implementations of the disclosed technology, the computer service provider 100 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 100 includes a plurality of server computers 102A-102C. While only three server computers are shown, any number can be used, and large centers can include thousands of server computers. The server computers 102A-102C can provide computing resources for executing software instances 106A-106C. In one embodiment, the instances 106A-106C are virtual machines. As known in the art, a virtual machine is an instance of a software implementation of a machine (i.e., a computer) that executes applications like a physical machine. In the example of virtual machine, each of the servers 102A-102C can be configured to execute a hypervisor 108 or another type of program configured to enable the execution of multiple instances 106 on a single server. Additionally, each of the instances 106 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 104 can be reserved for executing software components for managing the operation of the server computers 102 and the instances 106. For example, the server computer 104 can execute a management component 110. A user can access the management component 110 to configure various aspects of the operation of the instances 106 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 112 can scale the instances 106 based upon rules defined by the user. In one embodiment, the auto scaling component 112 allows a user to specify scale-up rules for use in determining when new instances should be instantiated and scale-down rules for use in determining when existing instances should be terminated. The auto scaling component 112 can consist of a number of subcomponents executing on different server computers 102 or other computing devices. The auto scaling component 112 can monitor available computing resources over an internal management network and modify resources available based on need.

A deployment component 114 can be used to assist users in the deployment of new instances 106 of computing resources. The deployment component can have access to account information associated with the instances, such as who is the owner of the account, credit card information, country of the owner, etc. The deployment component 114 can receive a configuration from a user that includes data describing how new instances 106 should be configured. For example, the configuration can specify one or more applications to be installed in new instances 106, provide scripts and/or other types of code to be executed for configuring new instances 106, provide cache logic specifying how an application cache should be prepared, and other types of information. The deployment component 114 can utilize the user-provided configuration and cache logic to configure, prime, and launch new instances 106. The configuration, cache logic, and other information may be specified by a user using the management component 110 or by providing this information directly to the deployment component 114. The instance manager can be considered part of the deployment component.

User account information 115 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

A network 130 can be utilized to interconnect the server computers 102A-102C and the server computer 104 for transmission of packet data therebetween. The network 130 can be a local area network (LAN) and can be connected to a Wide Area Network (WAN) 140 so that end users can access the compute service provider 100. It should be appreciated that the network topology illustrated in FIG. 1 has been simplified and that many more networks and networking devices can be utilized to interconnect the various computing systems disclosed herein.

A second network 150 can be independent of the local area network 130 and use separate cabling for interconnecting the server computers 102A-102C. More specifically, the second network 150 can be a dedicated clock distribution network that receives a reference time clock 152 and that distributes the reference time clock via a dedicated cabling 156 (shown in dashed lines) to the server computers 102A-102C. In some instances, the second network 150 can share cables with the local area network 130, although different wires or fibers in the cable are used for the different networks. For example, connection to the server computers 102 can use the same cable for both the local area network 130 and the clock distribution network 150. The reference time clock 152 can be a highly reliable and auditable microsecond range UTC time source that delivers a pulse over the timing network 150 at predetermined time intervals, such as one pulse per second (pulse per second (PPS)) 158. The server computers 102A-102C can receive the time signal from the dedicated timing network 150 via the independent cabling 156 and use the time signal within a clock synchronization firmware 160 to synchronize a system clock 170 on the server computer. The synchronized system clock 170 can then be used by the instances 106A-106C on the server computers 102A-102C. In this way, each of the server computers 102A-102C operates on the same timing.

The reference time clock 152 is obtained from one of multiple reference time sources, such as shown at 180, 182 (additional time sources can be added). Such time sources can be different. For example, one of the timing sources can be derived from a Global Navigation Satellite System. The other timing source can be received from an atomic clock or some other non-satellite source. Additionally, one source can be a wire that has timing pulses thereon (e.g., a stand-alone signal). Another source can be packet related wherein the timing information is embedded in a packet header or in data. The reference time sources 180, 182 can be input into clock switching logic 184 (which can also be part of the clock distribution network 150 but is shown separately for illustration). As further described below, the clock switching logic 184 can determine which reference time clock 180, 182 is valid and best suited for distribution as the clock 152. If the clock that is selected becomes problematic, switching to a different clock can occur without any loss of clock 152 because the switching occurs merely through writing a register within the clock switching logic 184 that performs a seamless switching of the clock. Thus, using the clock switching logic 184, multiple reference time clocks can be analyzed and prioritized as being the appropriate clock to distribute. Failover can occur by switching to one of the other clocks without a need for re-synchronization when an error condition exists for a previously selected clock.

Figure 2:
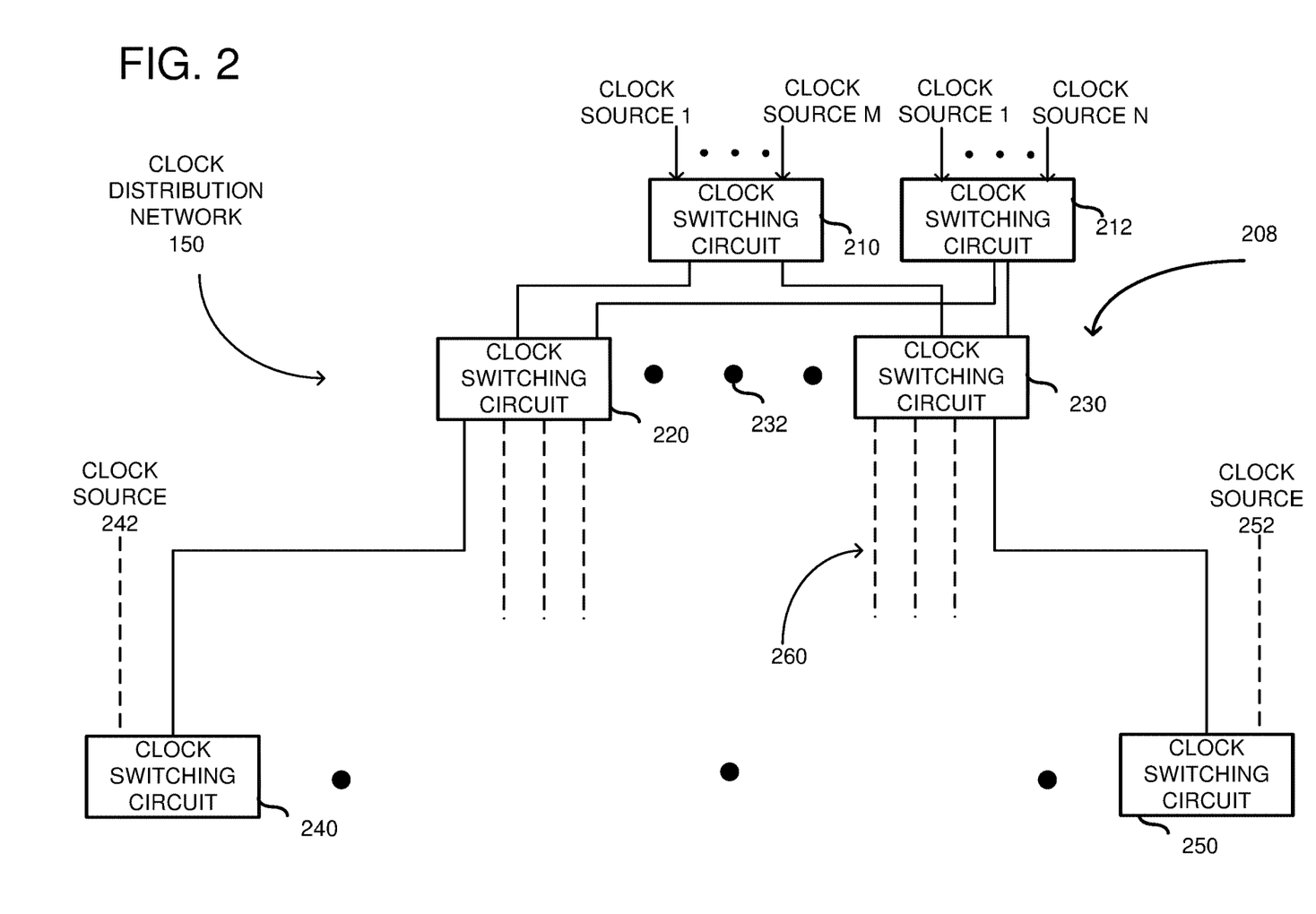
FIG. 2 shows an embodiment of the clock distribution network of FIG. 1 with a hierarchical structure of clock switching circuits.

FIG. 2 shows an example of the clock distribution network 150 of FIG. 1, which can include a hierarchical structure 208 of clock switching circuits. At a top level, clock switching circuits 210, 212 can receive input clock signals from different sources. For example, clock switching circuit 210 receives M input clock signals, where M is any integer number. Likewise, the clock switching circuit 212 receives N input clock signals, where N is any integer number. Some of the clock sources into switching circuit 210 can be the same sources input into clock switching circuit 212, and other clock sources can be different. The clock switching circuits 210, 212 each selects one of the clock inputs and distributes the selected clock signal to multiple other clock switching circuits 220, 230 at a second layer of the clock distribution network 150. In some cases, each clock switching circuit in a lower layer is coupled to an output of each clock switching circuit in an adjacent higher layer. Although the second layer shows only clock switching circuits 220, 230, the repetitive dots 232 represent that any number of clock switching circuits can form the second layer. In one example, each clock switching circuit generates 48 output clock signals. In such a case, the second layer has 48 different clock switching circuits and a next layer has 48*48=2,304. A final layer including clock switching circuits 240, 250 is shown coupled to the second layer, but many intermediate layers can be positioned between the second layer and the last layer depending on the number of layers in the hierarchical structure 208. The clock switching circuits 240, 250 can receive inputs from a layer of clock switching circuits above it, and also can receive inputs from other clock sources, as shown by clock sources 242, 252. At 260, clock signal paths are shown in dashed merely to indicate that each clock switching circuit 230 outputs multiple other clock signals. Ideally, each clock switching circuit receives the selected clock signal at the same time. The clock signals are then distributed to server computers within a compute server provider environment.

Figure 3:
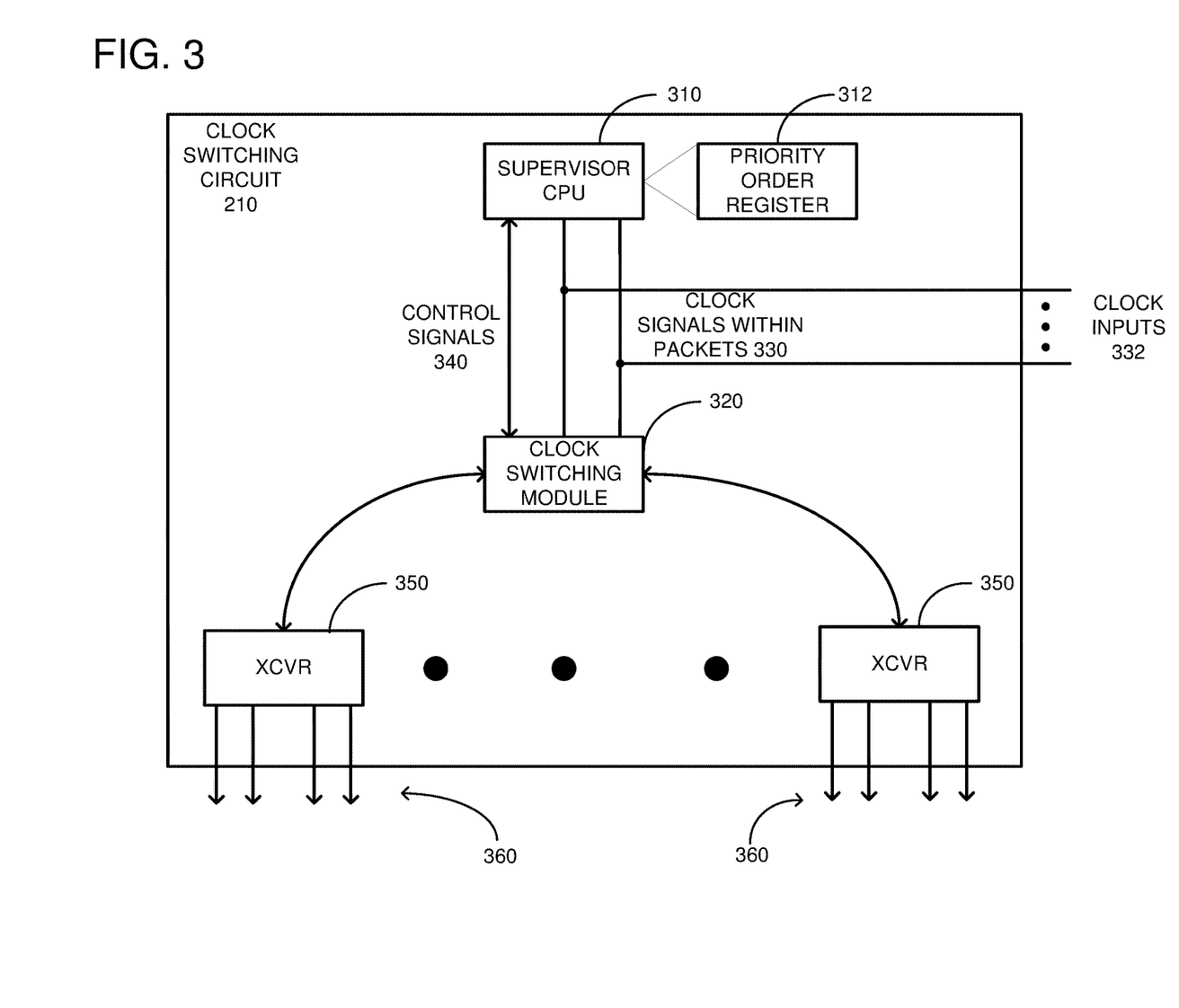
FIG. 3 is an embodiment of a clock switching circuit of FIG. 2 including a clock switching module.

FIG. 3 is a particular example of a clock switching circuit, such as clock switching circuit 210 from FIG. 2. The clock switching circuit 210 can be a single IC or multiple ICs and includes a supervisor central processing unit (CPU) 310 and a clock switching module 320. The supervisor CPU 310 can receive clock input signals 330 from clock inputs 332 and analyze the clock signals within the packets 330 to ensure the signals are valid. For example, the clock signals can include pulses that occur at predetermined intervals (e.g., every 1 second) and the supervisor CPU 310 can generate or read a timestamp every time a pulse is received. The supervisor CPU 310 can then calculate a difference between the timestamps of sequentially received clock signals (e.g., a first clock signal and then a next clock signal) and compare the difference to a predetermined value (e.g., 1 second). If the difference calculation is within a threshold limit of the predetermined value, then the clock signal can be validated. Otherwise, if the difference is outside of the limit, then the clock signal is invalidated and the supervisor CPU can exclude the clock signal from being used. The results of the analysis can be stored in a priority order register 312. Using the analysis, the supervisor CPU 310 generates control signals 340 that control which clock input 332 is used. For example, the supervisor CPU 310 can generate an identifier for use by the clock switching module.

The clock signals 330 are also transmitted to the clock switching module 320 that receives the control signal 340 from the supervisor CPU 310. The control signal 340 selects one of the clock signals 330 to be distributed to multiple transceivers (XCVR) 350 to be repeated to a next layer in the clock distribution network, as shown at 360. As described above, the clock signals transmitted by the transceivers 350 are embedded within packets. Thus, multiple clock signals are received, but only one of the clock signals is passed to the multiple transceivers for distribution to the clock distribution network. Although the supervisor CPU 310 is described as analyzing the metadata within the packets, the clock switching module 320 can perform the analysis on the received packets and make the determination whether or not to accept the received packets.

Figure 4:
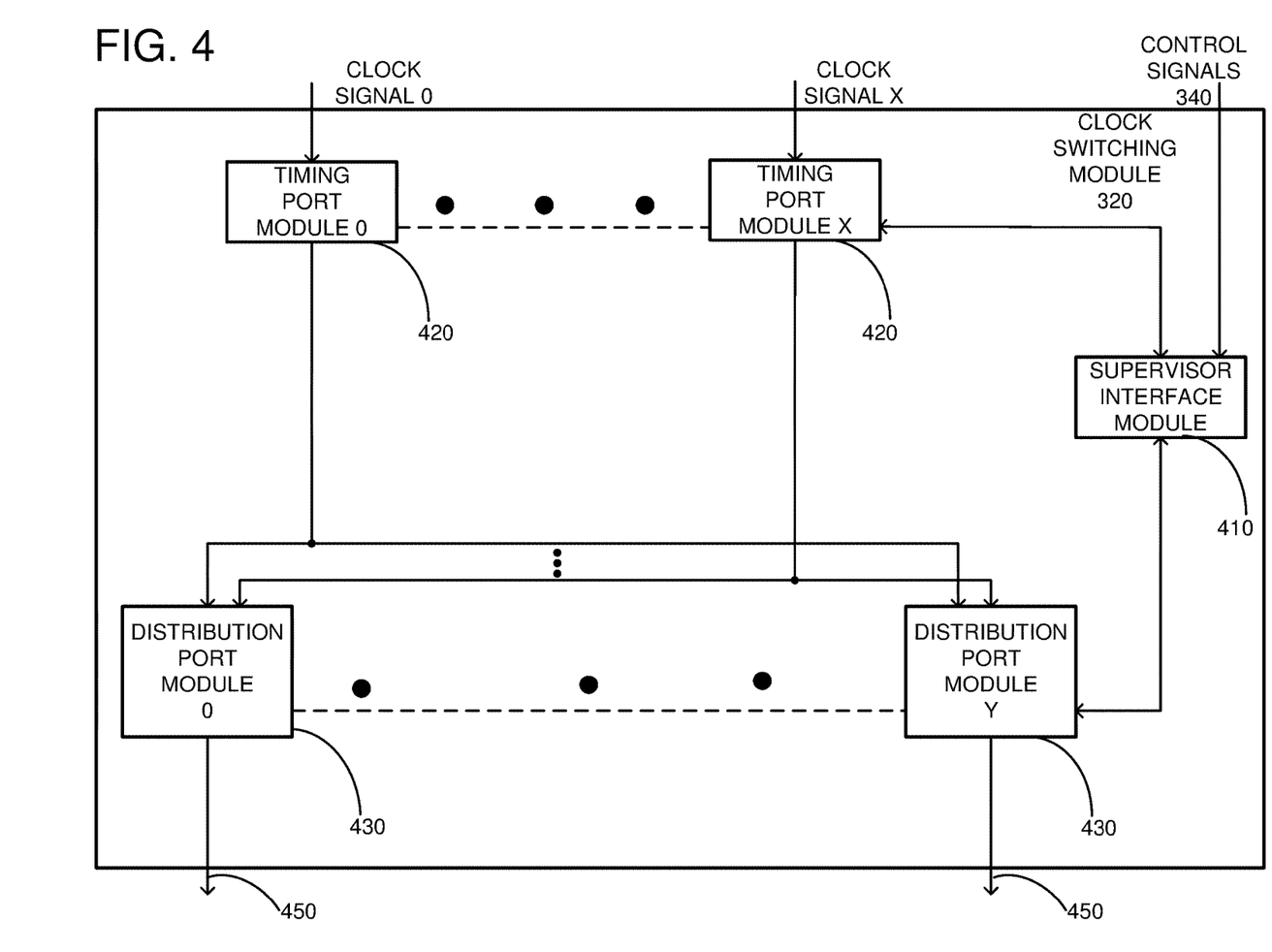
FIG. 4 is an embodiment of the clock switching module of FIG. 3, including a timing port module and a distribution port module.

FIG. 4 shows further details of the clock switching module 320, which can be a single IC. The clock switching module 320 includes a supervisor interface module 410, which receives the control signals 340 from the supervisor CPU 310 (FIG. 3) and distributes the control signals 340 to a plurality of timing port modules 420. The timing port modules 420 have a one-to-one relationship with the clock signals 330 (FIG. 3), the clock signals being shown as including clock signal 0 through clock signal X, where X is any integer number. The timing port modules 420 can generate a timestamp for each pulse received and pass the timestamps to the supervisor CPU 310 (FIG. 3) through the supervisor interface module 410, which is coupled in parallel to each timing port module 420. In such a case where time stamps are generated by the timing port module 420, the clock signals 330 need not be read directly by the supervisor CPU (as is shown in FIG. 3). Additionally, the supervisor interface module 410 is coupled in parallel to a plurality of distribution port modules 430. Each distribution port module 430 is coupled to all of the timing port modules 420 and passes one of the signals from the timing port modules to a clock signal 450. There are typically more distribution port modules 430 than timing port modules 420. For example, there are Y distribution port modules 430 shown, where Y is any integer value. In one simple example, there can be four timing port modules and 48 distribution port modules 430. However, each distribution port module 430 outputs one clock signal 450. Thus, the clock switching module 320 typically receives a number of clock signals X, selects one of the clock signals and replicates the selected clock signal on a greater number of outputs, where Y>X. The clock signals can then be transmitted to XCVR 350 (FIG. 3).

Figure 5:
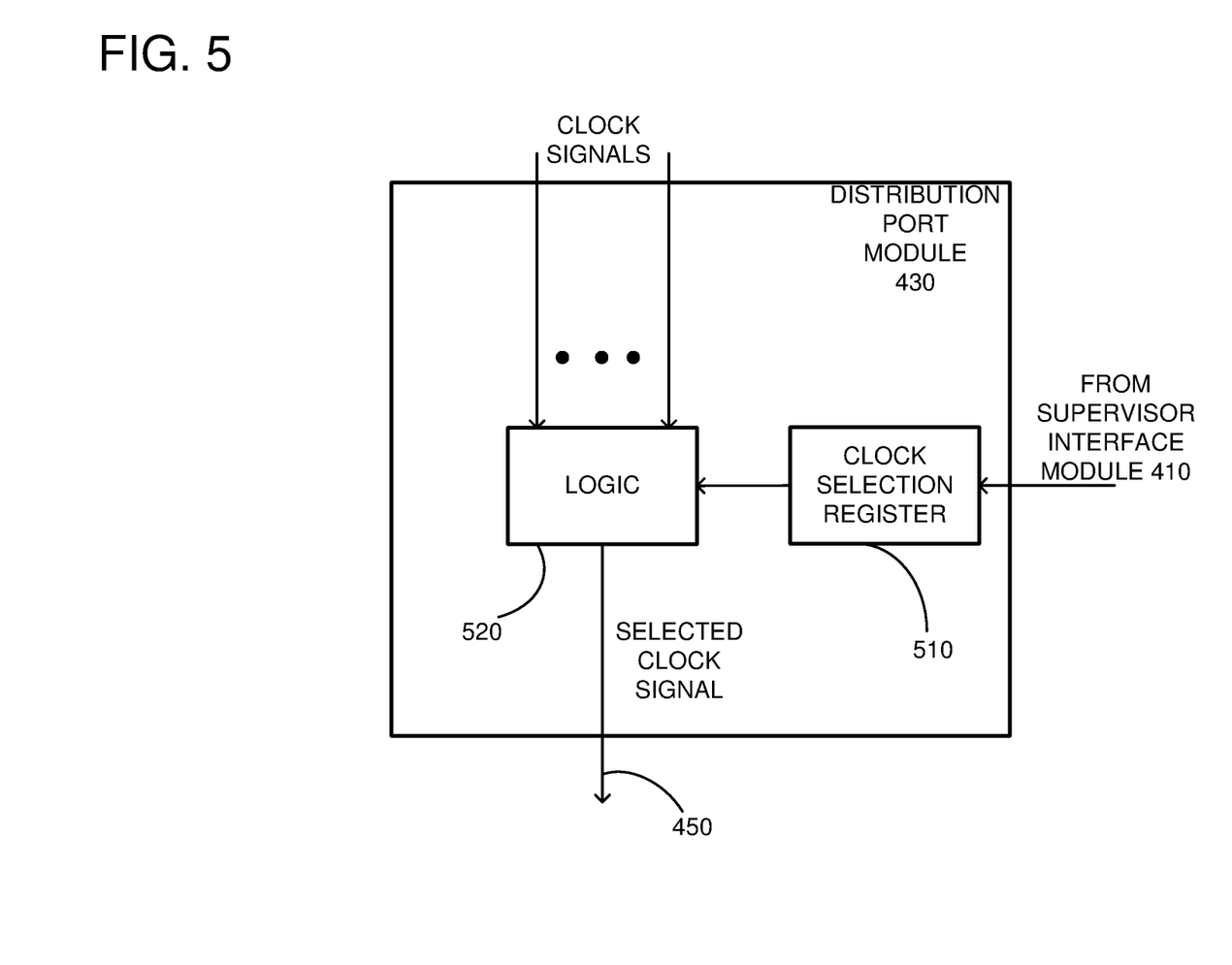
FIG. 5 is an embodiment of the distribution port module of FIG. 4.

FIG. 5 shows an example of the distribution port module 430 of FIG. 4. The distribution port module 430 can include a clock selection register 510 and logic 520 responsive to the clock selection register 510 to select one of multiple input clock signals for output on the clock signal 450. The clock selection register 510 can be a multi-bit memory register that is writeable and readable from the supervisor so that the supervisor can control switching of the clock signals through use of an identifier of the selected clock signal. The logic 520 can be a simple multiplexer or other combinatorial logic. The distribution port module can also include an embedded transceiver or the transceiver can be separated therefrom. For a failover condition wherein a selected clock signal becomes corrupted or otherwise not functioning properly, the supervisor CPU 310 can merely write the clock selection register 510 with a different identifier and switch the selected clock signal 450 to a different clock input. All of the clock selection registers within the distribution port modules can be written simultaneously and in parallel. Alternatively, the registers can be written individually. However, writing of all of the registers should be complete before the next PPS signal is transmitted so as to retain timing fidelity for downstream recipients. No additional logic is needed to resynchronize the new clock. Instead, the clock signals entering the logic 520 are all validated already and switching between them is seamless and can occur between pulses without any down-stream disruption. Although each distribution port module 430 is shown with its own clock selection register 510, a single clock selection register can be within the supervisor interface module 410 and the single clock register is used to control all of the distribution port modules 430 in parallel.

Figure 6:
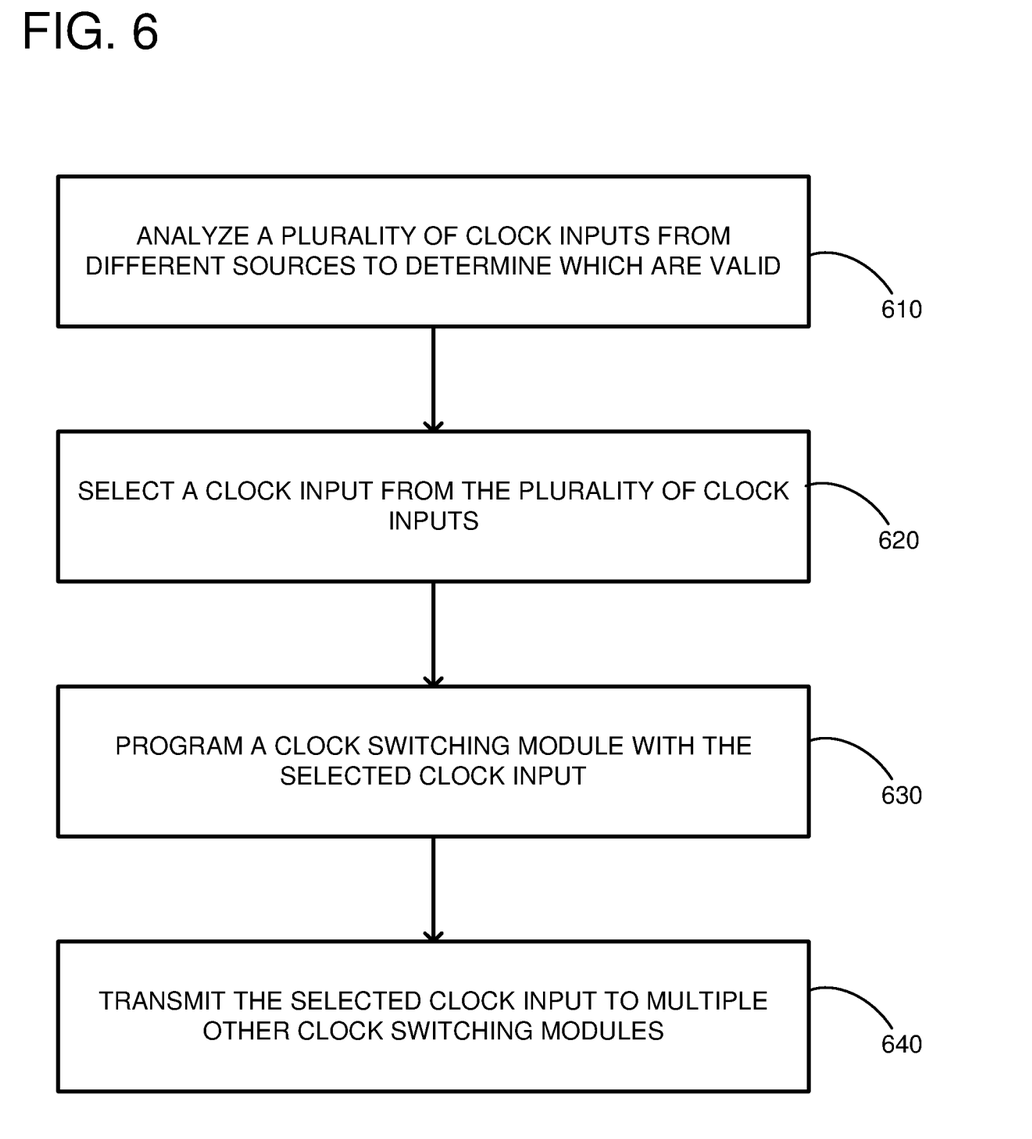
FIG. 6 is a flowchart according to one embodiment for selecting a clock signal to be distributed.

FIG. 6 is a flowchart according to one embodiment for clock selection in a clock distribution network. In process block 610, a plurality of clock inputs is analyzed from different sources to determine which are valid. For example, the supervisor CPU 310 (FIG. 3) can analyze the clock signals 330 directly or, as in FIG. 4, the supervisor CPU 310 can read time stamps from the timing port modules 420 via the supervisor interface module 410. In either case, the supervisor CPU 310 can determine whether pulses are being received at regular intervals by taking a difference in timestamps and comparing the difference value to known predetermined intervals, which is typically a fixed number, such as 1 second. At process block 620, a clock input is selected from the plurality of clock inputs. For example, the supervisor CPU 310 can select one of the clock inputs that has the closest value to the predetermined interval. Alternatively, the supervisor CPU 310 can have a predetermined order for all clock signals that are valid. Still further, the CPU 310 can select the clock signal based on a random selection. Thus, a variety of different algorithms can be used for assigning a priority order. In any case, the priority order can be stored in the priority order register 312 (FIG. 3). In process block 630, a clock switching module can be programmed with the selected clock input. For example, in FIG. 5, the clock selection register 510 can be programmed such as to control the logic 520 and allow the selected clock signal to pass. The programming can include writing an ID into the clock selection register 510. In process block 640, the selected clock is transmitted to multiple other clock switching modules. For example, in FIG. 5, the selected clock signal 450 is distributed. As shown in FIG. 2, the distributed clock signal can be received by down-stream clock switching circuits, such as circuit 250.

Figure 7:
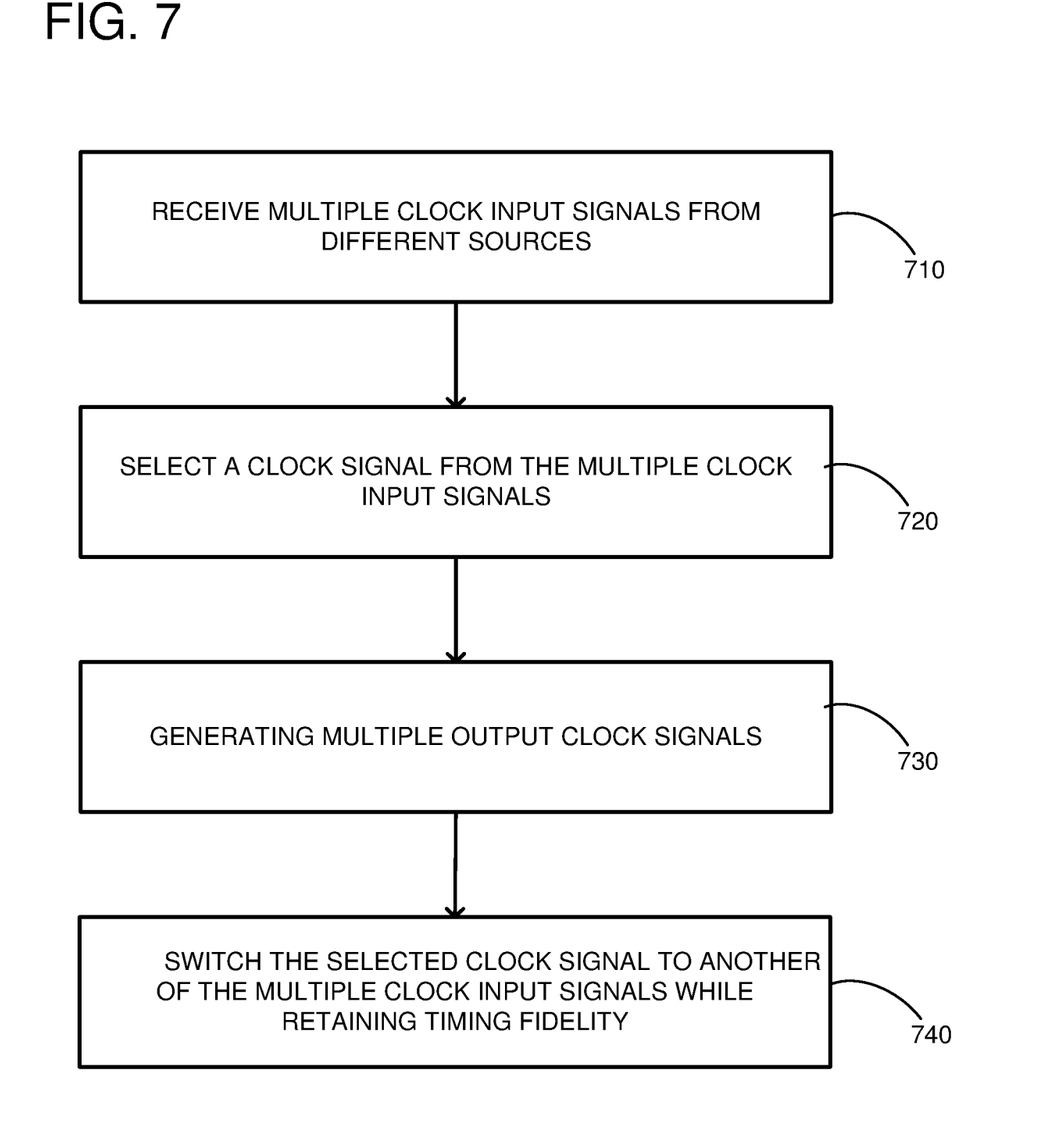
FIG. 7 is a flowchart according to another embodiment for selecting a clock signal to be distributed.

FIG. 7 is a flowchart according to another embodiment for selecting clock signals in a clock distribution network. In process block 710, multiple clock input signals are received from different sources. For example, FIG. 1 shows at least two different time sources 180, 182, and the time sources can be in different formats (e.g., packet vs. pulse) and from different sources (e.g., satellite vs. atomic). In process block 720, a clock signal is selected from the multiple clock input signals. For example, the supervisor CPU 310 (FIG. 2) can select amongst the clock signals based on the validation process performed, such as by checking conformance with predetermined timing guidelines. In process block 730, multiple output clock signals are generated that are based upon the selected clock. For example, in FIG. 4, the selected clock can be transmitted on multiple clock signals 450. In process block 740, the selected clock signal is switched to another of the multiple clock input signals while retaining timing fidelity. For example, in FIG. 5, the clock selection register 510 can be written with a new identifier, which switches the logic 520. Because the clock signals are already valid, the switching is performed without downstream recipients of the clock signal knowing that a switch has occurred. Retaining of timing fidelity means that a transition occurs between the clock signals used without stopping or resynchronizing downstream components in a seamless fashion.

Figure 8:
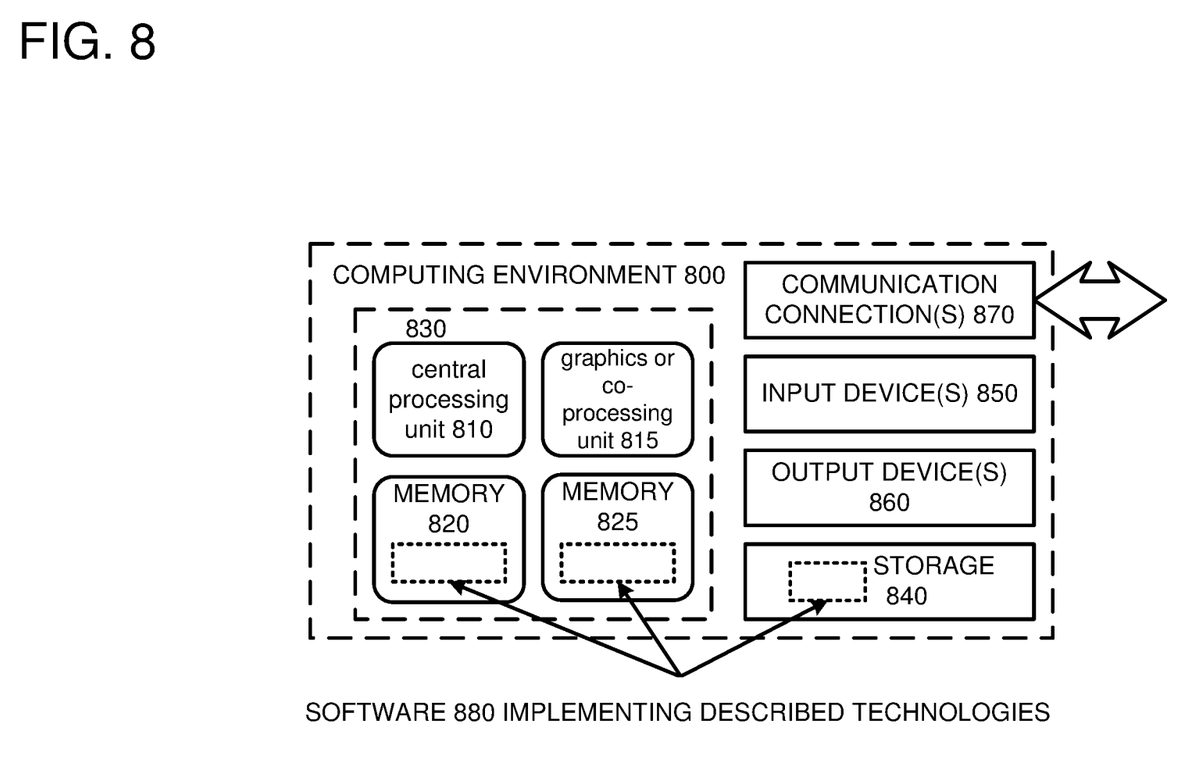
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

The computing environment 800 can be used for components of FIG. 3, such as the supervisor CPU 310.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. The communication connection 870 can be coupled to the dedicated clock distribution network 150 (FIG. 1). Thus, the computing environment 800 can receive a PPS signal 158 and synchronize its system clock 170 using the PPS signal.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of selecting a clock signal in a clock distribution network, the method comprising:
    analyzing a plurality of clock inputs from different sources to determine which of the clock inputs are valid, wherein each of the plurality of clock inputs includes a different clock signal;
    selecting a clock input from the plurality of clock inputs based upon the analyzing;
    programming a clock switching module with an identifier of the selected clock input;
    transmitting the selected clock input to multiple other clock switching modules in the clock distribution network, wherein the clock distribution network includes at least three hierarchical levels of clock switching modules, with each clock switching module at each level including a supervisor processor for switching control signals to control which clock signal is transmitted to a next level in the hierarchical levels;
    for each of the plurality of clock inputs, generating a first timestamp when a first pulse occurs, generating a second timestamp when a second pulse occurs, determining a difference between the two time stamps and comparing the difference to a predetermined interval;
    assigning a priority order to the clock signals based upon the determined differences and storing the priority order of the clock signals in a priority order register, wherein the supervisor processor uses the priority order in the priority order register to perform the control of which clock signal is transmitted to the next level in the hierarchical levels.

2. The method of claim 1, wherein the programming of the clock switching module includes writing a clock-selection register in the clock switching module, which controls which of the plurality of clock inputs to transmit.

3. The method of claim 1, wherein the clock distribution network is within a compute service provider environment and is separate from a network for distributing user packets.

4. The method of claim 1, wherein one of the plurality of clock inputs is a pulse at predetermined inputs and another of the plurality of clock inputs is packet data including timing information.

5. A method, comprising:
    receiving multiple clock input signals from different sources;
    selecting a clock signal from the multiple clock input signals;
    generating multiple clock output signals for distribution of the selected clock signal in a clock-distribution network, wherein the clock-distribution network includes at least three hierarchical levels of clock switching circuits, with each clock switching circuit at each level including a supervisor processor for switching control signals to control which clock signal is transmitted to a next level in the hierarchical levels;
    for each of the plurality of clock output signals, generating a first timestamp when a first pulse occurs, generating a second timestamp when a second pulse occurs, determining a difference between the two time stamps and comparing the difference to a predetermined interval;
    assigning a priority order to the clock output signals based upon the compared differences in the predetermined intervals and storing a priority order of the clock output signals in a priority order register, wherein the supervisor processor uses the priority order in the priority order register to perform the control of which clock signal is transmitted to the next level in the hierarchical levels; and
    switching the selected clock signal to another of the multiple clock input signals while retaining timing fidelity, wherein the switching occurs using the clock switching circuits and is controlled by the supervisor processor by reading which clock output signal is identified as being next in the priority order register.

6. The method of claim 5, further including analyzing the multiple clock input signals and validating that the multiple clock input signals are operational.

7. The method of claim 5, wherein the clock-distribution network is separate from a network used for distributing network packets of users of a compute service provider.

8. The method of claim 5, wherein the multiple clock signals from different sources includes a pulse signal received at predetermined intervals as a stand-alone signal or embedded within a network packet.

9. The method of claim 5, wherein the selecting of the clock signal includes selecting only one of the multiple clock input signals to be distributed over the clock-distribution network.

10. The method of claim 5, wherein the switching to another of the multiple clock signals occurs by writing a register.

11. An Integrated Circuit (IC), comprising:
 a plurality of timing ports for receiving clock input signals from different sources;
 a plurality of distribution ports, each coupled to all of the plurality of timing ports, the plurality of distribution ports each including a register or receiving signals from a register for selecting which of the clock input signals from the plurality of timing ports passes to outputs of the IC, wherein the IC is included in a hierarchy of the ICs and wherein each IC in the hierarchy is configured to receive switching control signals to control which of the clock input signals is transmitted to a next level in the hierarchy; and
 a priority order register for storing a priority order of which clock input signals are closest to having a predetermined interval, wherein the switching control signals are controlled by a supervisor processor that is configured to use the priority order in the priority order register to perform control of which clock input signal is transmitted to the next level in the hierarchical levels.

12. The IC of claim 11, wherein a first of the different sources includes a pulse signal derived from a satellite signal and a second of the different sources is derived from a network packet.

13. The IC of claim 11, wherein each of the plurality of distribution ports outputs a same selected clock input signal.

14. The IC of claim 11, wherein the IC is for switching between clock input signals based upon an identifier in the register.

15. The IC of claim 11, further including a supervisor interface coupled to all of the distribution ports for writing the registers in the plurality of distribution ports.

\* \* \* \* \*